US009471516B2

(12) United States Patent
Wong et al.

(10) Patent No.: US 9,471,516 B2
(45) Date of Patent: Oct. 18, 2016

(54) TECHNIQUES FOR TRANSMITTING A COMMAND TO CONTROL A PERIPHERAL DEVICE THROUGH AN AUDIO PORT

(71) Applicant: Facebook, Inc., Menlo Park, CA (US)

(72) Inventors: Kean Wong, Menlo Park, CA (US); Charles Hughes, Menlo Park, CA (US); Shafigh Shirinfar, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 419 days.

(21) Appl. No.: 13/966,704

(22) Filed: Aug. 14, 2013

(65) Prior Publication Data
US 2015/0052270 A1 Feb. 19, 2015

(51) Int. Cl.
G06F 13/12 (2006.01)
G06F 13/42 (2006.01)
G06F 13/38 (2006.01)

(52) U.S. Cl.
CPC .......... *G06F 13/124* (2013.01); *G06F 13/385* (2013.01); *G06F 13/4291* (2013.01)

(58) Field of Classification Search
CPC . G06F 13/124; G06F 13/385; G06F 13/4291
See application file for complete search history.

(56) References Cited

U.S. PATENT DOCUMENTS

| 5,758,073 A * | 5/1998 | Liang | G06F 13/4291 709/208 |
| 2006/0064303 A1* | 3/2006 | Seiler | G06F 3/16 704/276 |
| 2006/0214902 A1* | 9/2006 | Tamura | G06F 3/1431 345/100 |
| 2006/0274023 A1* | 12/2006 | Sultenfuss | G09G 3/3406 345/102 |
| 2007/0009108 A1* | 1/2007 | Furge | H03F 3/181 381/86 |
| 2013/0087614 A1* | 4/2013 | Limtao | G06K 7/083 235/449 |

FOREIGN PATENT DOCUMENTS

WO WO 2013/051992 * 9/2013

OTHER PUBLICATIONS

"I2C-bus specification", NXP Semiconductors, Revision 5, published Oct. 2012, 64 pages, (author unknown).
"System Management Bus (SMBus) specification", SBS Implementers Forum, Version 2.0, published in Aug. 3, 2000, 59 pages, (author unknown).
"1-Wire Network, Design Guide v1.0", Springbok Digitronics, published Aug. 2004, 96 pages, (author unknown).

* cited by examiner

*Primary Examiner* — Eric Oberly

(57) ABSTRACT

Examples are disclosed for transmitting a command to control a peripheral device through an audio port. In some examples, the peripheral device may be coupled to a computing device via an interconnect. The interconnect may have an audio jack to couple with the computing device through an audio port and a connector to couple with a serial interface at the peripheral device. For these examples, elements of the computing device may receive a command to control the peripheral device and may generate analog signals including the command and a clock signal. The analog signals may then be transmitted through the audio port. The interconnect may be capable of converting the analog signals to a digital signal that includes the command and clock signal then provide the digital signal to the serial interface at the peripheral device. Other examples are described and claimed.

28 Claims, 14 Drawing Sheets

1300

RECEIVE, AT A PROCESSOR CIRCUIT FOR A COMPUTING DEVICE, A COMMAND TO CONTROL A PERIPHERAL DEVICE COUPLED TO THE COMPUTING DEVICE VIA AN INTERCONNECT HAVING AN AUDIO JACK COUPLED WITH AN AUDIO PORT OF THE COMPUTING DEVICE AND ALSO HAVING A CONNECTOR COUPLED WITH A SERIAL INTERFACE OF THE PERIPHERAL DEVICE
*1302*

GENERATE ANALOG SIGNALS THAT INCLUDE THE COMMAND AND A CLOCK SIGNAL

*INCLUDE THE COMMAND IN A FIRST ANALOG SIGNAL*
    *1306*

*INCLUDE THE CLOCK SIGNAL IN A SECOND ANALOG SIGNAL*
    *1308*

*1304*

TRANSMIT THE ANALOG SIGNALS THROUGH THE AUDIO PORT COUPLED WITH THE AUDIO JACK

*TRANSMIT THE FIRST ANALOG SIGNAL VIA A RIGHT AUDIO CHANNEL OF THE AUDIO PORT*
    *1312*

*TRANSMIT THE SECOND ANALOG SIGNAL VIA A LEFT AUDIO CHANNEL OF THE AUDIO PORT*
    *1314*

TECHNIQUES FOR TRANSMITTING A COMMAND TO CONTROL A PERIPHERAL DEVICE THROUGH AN AUDIO PORT

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various examples are generally directed to techniques for transmitting a command to control a peripheral device through an audio port. The techniques may include receiving, at a processor circuit for a computing device, a command originating from an application. The command may be to control a peripheral device coupled to the computing device via an interconnect having an audio jack coupled with an audio port of the computing device. Analog signals may then be generated that include the command and a clock signal. The analog signs may then be transmitted through the audio port coupled with the audio jack. According to some examples, the interconnect may be capable of converting the analog signals to a command digital signal and a digital clock signal. The command digital signal and the clock digital signal may then be provided to a serial interface at the peripheral device via a connector.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 13 illustrates an example logic flow.

DETAILED DESCRIPTION

According to some examples, a computing device such as a smart phone, tablet or a portable personal computer (e.g., a laptop computer) may include one or more serial interfaces to couple to peripheral devices such as external displays or speakers. The various serial interfaces may be associated with one or more technologies that may include, but are not limited to, universal serial bus (USB), peripheral component interface express (PCIe) or Thunderbolt™. In some examples, a given computing device may have a limited number of serial interfaces to couple to a wide array of peripheral devices.

Some peripheral devices may also include a limited number of serial interfaces via which the given computing device may communicate with or attempt to control certain functions of the peripheral device (e.g., control a display). Further, some peripheral devices and/or controllers for peripheral devices may include relatively simple serial interfaces that may not be associated with any of the above mentioned technologies. For example, inter-integrated circuit ($I^2C$) interfaces, system management bus (SMBus) interfaces or 1-Wire® interfaces may be an example serial interface option for these types of peripheral devices. Also, even if peripheral devices include at least some interfaces associated with such technologies as USB, PCIe or Thunderbolt, communicating with and/or controlling through these types of serial interfaces may be difficult or cumbersome to implement. This difficulty may discourage some possible uses of peripheral devices such as external displays that may include light emitting diode (LEDs) capable of emitting or displaying at least some colored light.

Use of other types of interfaces or ports may be considered due to a limited number or type of serial interfaces at a computing device or peripheral device. Difficult or cumbersome implementations using some types of serial interfaces may also result in use of other types of interfaces or ports coupled to at least the computing device. For example, an audio port is common for most computing devices. Typically, the audio port may accommodate standard audio jacks such as 3.5 millimeter (mm) audio jacks having standard type TRRS connectors ("tip" "ring" "ring" "sleeve"). However, audio ports when coupled with audio jacks are typically configured to transmit audio from the computing device via analog signals. Also, captured sound (e.g., via a microphone) may be received via analog signals routed through the audio jack to the computing device through the audio port. The configuration of these audio ports to transmit or receive just analog signals may be problematic to using audio ports for sending commands to control a peripheral device that may have serial interfaces that communicate via digital signals. It is with respect to these and other challenges that the examples described herein are needed.

Figure 1:
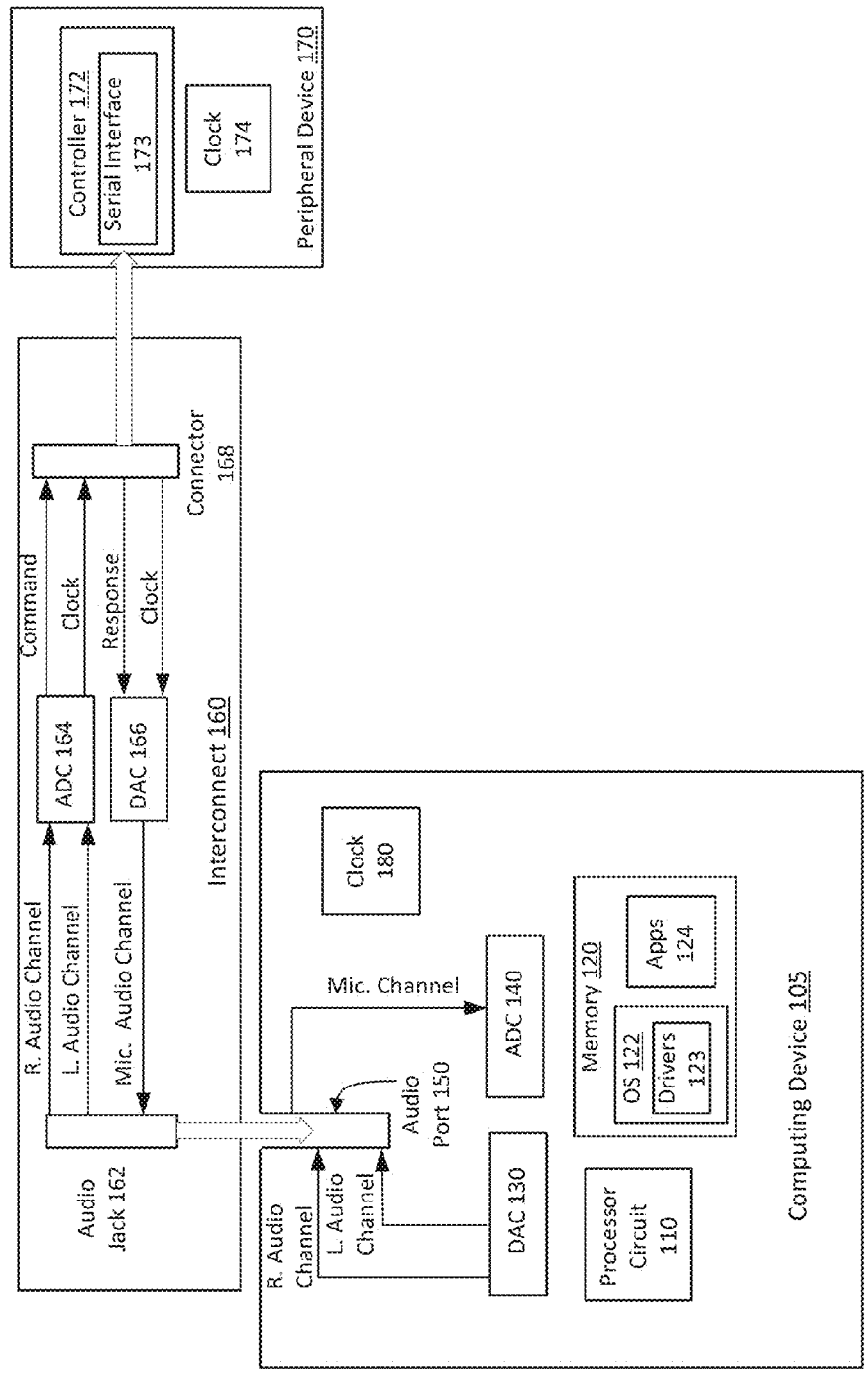
FIG. 1 illustrates an example system.

FIG. 1 illustrates an example system 100. As shown in FIG. 1, system 100 includes a computing device 105, an interconnect 160 and a peripheral device 170. According to some examples, as shown in FIG. 1, computing device 105 may include a processor circuit 110, a memory 120, a digital-to-analog converter (DAC) 130, an analog-to-digital converter (ADC) 140, an audio port 150 and a clock 180. In some examples, memory 120 may include an operating system (OS) 122 having drivers 123 and may also include one or more applications (Apps) 124.

In some examples, drivers 123 may be arranged to generate one or more command signals in response to one or more commands received from Apps 124 to control peripheral device 170. The one or more command signals may be generated based on a binary-based digital format for a type of serial interface (e.g., $I^2C$, 1-Wire or SMBus) to control peripheral device 170. Logic and/or features at computing device 105 may utilize DAC 130 to convert the one or more command signals in the binary-based digital format as well as an associated clock signal generated by clock 180 to analog signals. Also, the logic and/or features may transmit the analog signals that include the one or more commands and the clock signal via right (R.) and left (L.) audio channels routed through and/or included in audio port 150. For these examples, audio port 150 may be arranged or configured to couple with or receive a standard type TRRS audio jack that may have a connector length of 3.5 mm. In other examples, other types of audio jacks having longer or shorter lengths may be contemplated and examples are not limited to TRRS audio jacks have a connector length of 3.5 mm.

According to some examples, as shown in FIG. 1, interconnect 160 includes an audio jack 162, an ADC 164, a DAC 166 and a connector 168. Audio jack 162 may be configured as a standard type TRRS audio jack having an audio port connector length of 3.5 mm. For these examples, R. and L. audio channels may be routed from audio jack 162 to ADC 164. As mentioned above, in some examples, logic and/or features at computing device 105 may have caused analog signals including one or more commands and the clock signal to be transmitted through audio port 150. These analog signals may be further routed through audio jack 162 and then converted to digital signals using ADC 164. The digital signals outputted following the conversion may include first and second digital signals that may represent the one or more commands in the first digital signal and the clock signal in the second digital signal. The first and second digital signals may then be routed through connector 168 to peripheral device 170.

In some examples, as shown in FIG. 1, peripheral device 170 may include a controller 172 having a serial interface 173. Peripheral device may also include a clock 174. For these examples, connector 168 of interconnect 160 may be capable of coupling or connecting with serial interface 173, e.g., via a serial interface connector (not shown). According to some examples, the one or more commands and the clock signal included in the first and second digital signals may be routed through connector 168 to serial interface 173 at peripheral device 170. Logic and/or features of controller 172 may then be capable of interpreting/decoding the one or more commands included in the first and second digital signals and then executing and/or responding to the one or more commands.

According to some examples, logic and/or features of controller 172 may generate a response to the one or more commands. For these examples, the response may be routed through connector 168 as a digital signal. Also, a clock signal, synchronized with the clock received with the one or more commands, may be generated by clock 174 and caused by controller 172 to be routed through connector 168 as another digital signal. The digital signals including the response and the clock signal may then be converted to an analog signal by DAC 166 and routed via a microphone (Mic.) audio channel routed through or included in audio jack 162 and audio port 150. In some examples, logic and/or features at computing device 105 may then convert the analog signal received via the Mic. Audio channel to digital signals including the response and the clock signal using ADC 140. These digital signals may be in the same binary-based digital format for the type of serial interface (e.g., I²C, 1-Wire or SMBus) that was used to control peripheral device 170 when the one or more commands signals were generated by logic and/or features at computing device 105 to transmit the one or more commands originating from Apps 124.

Figure 2:
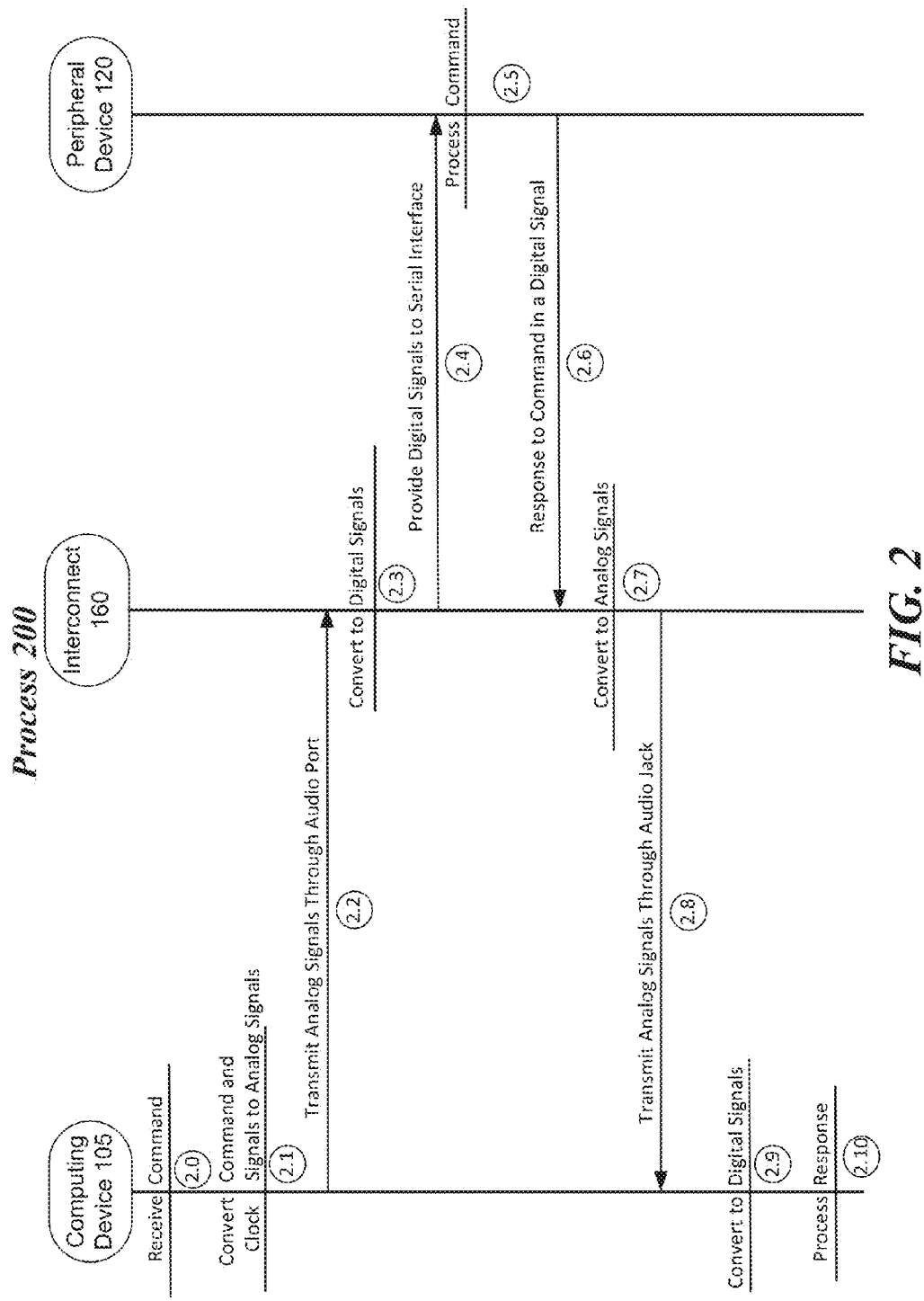
FIG. 2 illustrates an example process.

FIG. 2 illustrates an example process 200. In some examples, process 200 may be for a computing device to transmit a command through an audio port to control a peripheral device. For these examples, elements of system 100 as shown in FIG. 1 may be used to illustrate example operations related to process 200. However, the example operations are not limited to implementations using elements of system 100.

Beginning at process 2.0 (Receive Command), logic and/or features at computing device 105 such as driver 123 may receive a command originating from an application such as App 124. According to some examples, the command may be to control peripheral device 170 coupled to computing device via interconnect 160. For example, peripheral device 120 may include a light emitting diode (LED) display that App 124, responsive to user-generated inputs, may have sent the command to control the LED display. In some examples, driver 123 may generate a command signal in a binary-based digital format (e.g., in compliance with the I²C, 1-Wire or SMBus specifications/guidelines) that may represent the received command to control peripheral device 120. A clock signal generated by clock 180 may also be associated with the generated signal.

Proceeding to process 2.1 (Convert Command and Clock Signals to Analog Signals), logic and/or features at computing device 105 may use DAC 130 to convert the command and clock signals to analog signals. In some examples, a first analog signal to represent the command signal and a second analog signal to represent the clock signal may result from the conversion using DAC 130.

Proceeding to process 2.2 (Transmit Analog Signals through Audio Port), logic and/or features at computing device 105 may cause the analog signals to be transmitted through audio port 150 coupled to audio jack 162. According to some examples, the first analog signal representing the converted command signal may be transmitted over a first audio channel of audio port 150. Also, the second analog signal representing the converted clock signal may be transmitted over a second audio channel of audio port 150. The first and second audio channels, for example, may include left and right audio channels that may also be used to transmit stereo sounds to left and right speakers when an audio jack for a headset or other type of sound system is coupled to audio port 150. In some alternate examples, when the command digital signal is in a binary-based digital format in accordance with the 1-Wire design guide, both the command digital signal and the clock signal may be routed through one of the two audio channels.

Proceeding to process 2.3 (Convert to Digital Signals), interconnect 160 may include circuitry such as ADC 164 to convert analog signals representing the command and clock signals to a command digital signal and a clock digital signal. In some examples, ADC 164 may convert the first analog signal (e.g., received via the right audio channel) representing the command signal to a command digital signal in the same binary-based digital format as was used by driver 123 at process 2.0. ADC 164 may also convert the second analog signal (e.g., received via the left audio channel) represent the clock signal to a clock digital signal.

Proceeding to process 2.4 (Provide Digital Signals to Serial Interface), interconnect 160 may include circuitry to provide the command digital signal and the clock digital signals to serial interface 173 of controller 172 at peripheral device 170. According to some examples, the command digital signal may be forwarded over a data signal path of connector 168 that couples with serial interface 173 to provide the command digital signal to peripheral device 170. The clock digital signal may be forwarded over a clock signal path of connector 168 that couples with serial interface 173 to provide the clock digital signal to peripheral device 170. In some alternate examples, when the command digital signal is in a binary-based digital format in accordance with the 1-Wire design guide, both the command digital signal and the clock signal may be over a single signal path of connector 168 rather than the two separate signal paths as mentioned above for other examples.

Proceeding to process 2.5 (Process Command), logic and/or features at peripheral device 120 may process the command included in the received command digital signal. In some examples, controller 172 may be capable of decoding the command digital signal using the clock digital signal to receive and cause elements of peripheral device 170 (e.g., an LED display) to implement at least some aspects of the command.

Proceeding to process 2.6 (Response to Command in a Digital Signal), logic and/or features at peripheral device 120 such as controller 172 may provide a response to the command received from computing device 105. According to some examples, controller 172 may provide an indication of whether the command included in the received command digital signal was successfully received or implemented. For example, an acknowledgement (ACK) message may be provided to indicate successful receipt or implementation of the command or a negative acknowledgement (NAK) may be provided to indicate an unsuccessful receipt or implementation of the command.

In some examples, the response may be provided via serial interface 173 to connector 168 in a binary-based digital format along with a response clock signal generated by clock 174. According to some examples, the response in the binary-based digital format may be forwarded over a data signal path of connector 168 that couples with serial interface 173 to provide the response. The clock digital signal may be forwarded over a clock signal path of connector 168 that couples with serial interface 173 to provide the clock digital signal for the response. In some alternate examples, when the response signal is in a binary-based digital format in accordance with the 1-Wire design guide, both the response signal and the clock signal may be over a single signal path of connector 168 rather than the two separate signal paths as mentioned above for other examples.

Proceeding to process 2.7 (Convert to Analog Signals), the response and the associated clock signal provided by controller 172 may be converted by DAC 166 to a response analog signal representing both the response and the clock signal.

Proceeding to process 2.8 (Transmit Analog Signals through Audio Jack), the response analog signal may be forwarded by circuitry of interconnect 160 through a microphone audio channel of audio jack 162 to a microphone audio channel of audio port 150.

Proceeding to process 2.9 (Convert to Digital Signals), logic and/or features at computing device 105 may covert the response analog signal using ADC 140 to a digital response signal having an associated clock response signal. In some examples, the digital response signal may be in a binary-based digital format that includes the response originating from controller 173.

Proceeding to process 2.10 (Process Response), logic and/or features at computing device 105 may process the response that originated from controller 173 of peripheral device 170. According to some examples, driver 123 may determine whether an ACK or NAK message was included in the response. If an ACK message was received, driver 123 may indicate to App 124 the command was implemented. If a NAK message was received, driver 123 may cause the command and clock signals generated at process 2.0 to be resent. If a threshold number of NAK message responses are received, driver 123 may abort additional resend attempts and then notify App 124 that the command was not implemented or indicate an error.

In some examples, the digital response signal may include at least some information possibly gathered by controller 173 as peripheral device 170 implemented the command. For example, peripheral device 170 may include a basic optical scanner capable of optically capturing text or other printed characters in response to commands generated by App 124 and sent to controller 173 as mentioned above. Processing the response may include processing optically captured information included in data received with the response to recreate the text or printed characters at computing device 105 (e.g., on a display—not shown) or store the optically captured information to a storage device maintained at or with computing device 105 (not shown). Other types of peripheral devices that may capture some data responsive to a command and send the data with a response are contemplated and examples are not limited to a basic optical scanner.

Figure 3:
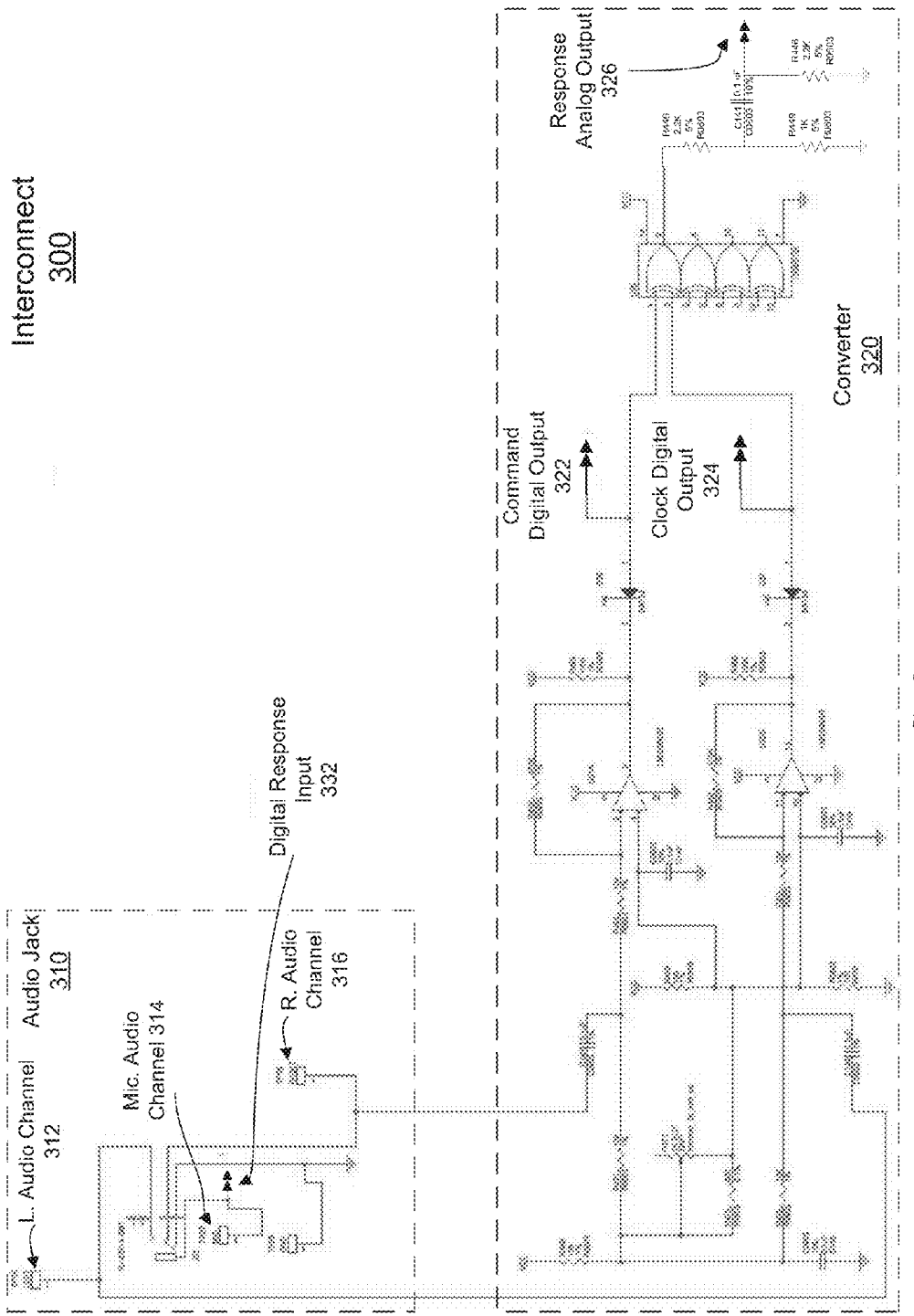
FIG. 3 illustrates an example interconnect.

FIG. 3 illustrates an example interconnect 300. In some examples, as shown in FIG. 3, interconnect 300 includes an audio jack 310 and a converter 320. Also as shown in FIG. 3, audio jack 310 include a left (L.) audio channel 312, a microphone (Mic.) audio channel 314 and a right (R.) audio channel 316. As mentioned previously, a computing device (e.g., computing device 105) may be capable of routing a first analog signal representing a command to control a peripheral device and a second audio channel capable of receiving a second analog signal representing a clock signal. According to some examples, the first analog signal may be routed through L. audio channel 312 and the second analog signal may be routed through R. audio channel 316.

In some examples, as shown in FIG. 3, interconnect 300 also includes a converter 320 having a command digital output 322, a clock digital output 324 or a response analog output 326. Converter 320 may be used to convert the first and second analog signals to a command digital signal that may be routed through command digital output 322 and a clock digital signal that may be routed through clock digital output 324.

In some examples, a response to the digital signal command from the peripheral device may be received via digital response input 332. For these examples, converter 320 may receive the digital response and may be used to convert the digital response. After conversion, a response analog signal may be outputted via response analog output 326 and then routed via Mic. Audio Channel 314 through an audio port of the computing device that originated the command.

In some examples, command digital signals or clock digital output signals may be formatted in compliance with one or more types of serial interface protocols. These one or more types of serial interface protocols may include, but are not limited to the I²C-bus specification, Revision 5, published October 2012, the 1-Wire Network, Design Guide, Version 1.0, published August 2004 or the System Management Bus (SMBus) specification, Version 2.0, published in August 2000.

Figure 4:
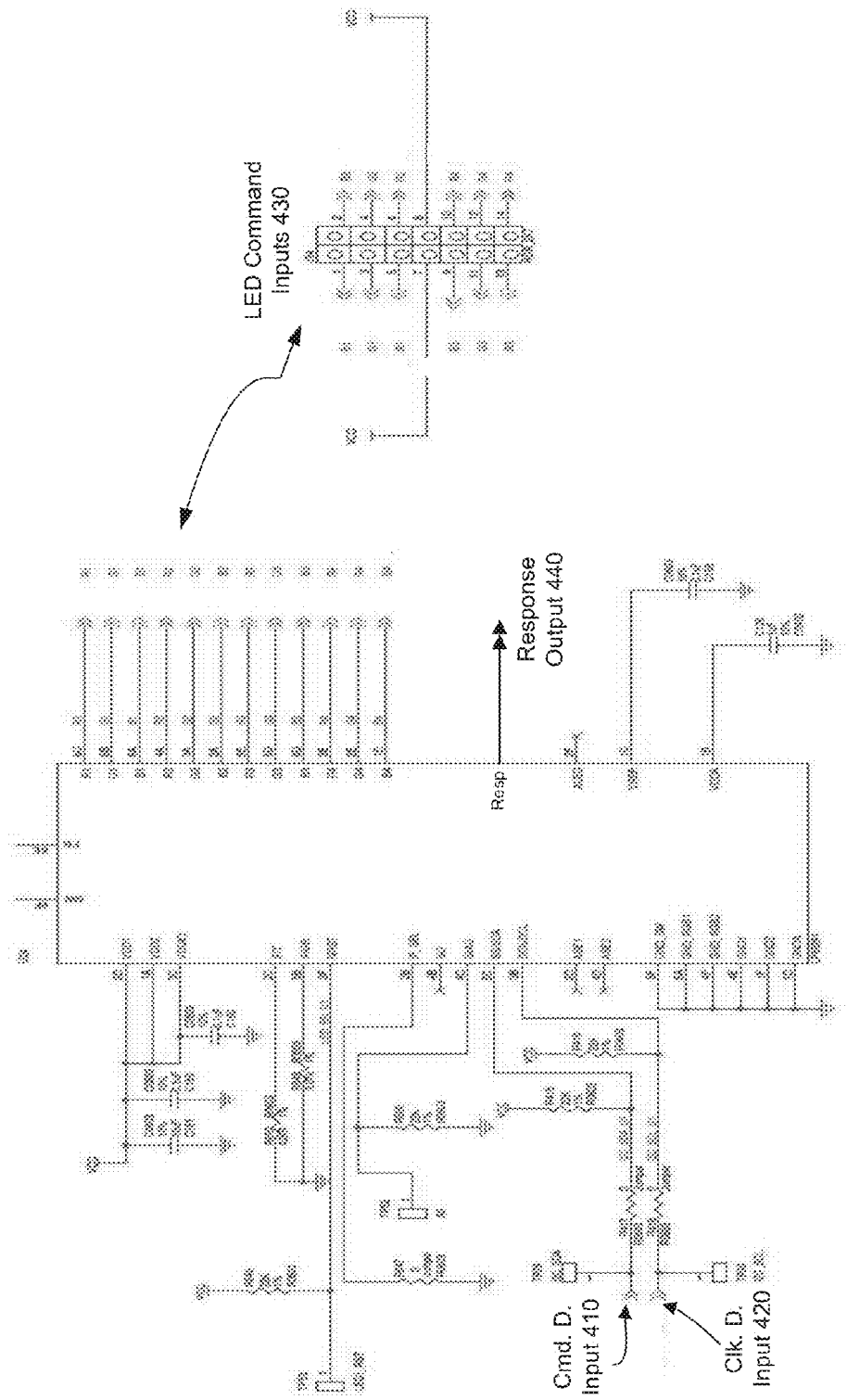
FIG. 4 illustrates an example first light emitting diode (LED) controller.

FIG. 4 illustrates an example first LED controller. The first LED controller, as shown in FIG. 4, includes a color/duration LED controller 400. In some examples, color/duration LED controller 400 may include command (Cmd.) digital (D.) input 410 and clock (Clk.) D. input 420 that may result in LED command inputs 430.

According to some examples, color/duration LED controller 400 may be at a peripheral device having a serial interface to receive one or more commands from a computing device (e.g., computing device 105) through an interconnect (e.g., interconnect 300) that couples the peripheral device to the computing device via an audio port. As mentioned above, the one or more commands may be provided to the serial interface in a binary-based digital format. For these examples, the one or more commands may be received at color/duration LED controller 400 through Cmd. D. input 410 and Clk. D. input 420. Circuitry at color/duration LED controller 400 may then generate LED command inputs 430 based on the one or more received commands.

In some examples, LED command inputs 430 may control color and duration for LEDs capable of producing blue (B), green (G) or red (R) colors for a given duration. As shown in FIG. 4, LED command inputs 430 may be for controlling four sets of R, G or B colored LEDs. These colored LEDs, for example, may be part of an LED display at the peripheral device.

According to some examples, color/duration LED controller 400 may be capable of generating or providing a response to the computing device that sent the one or more commands to indicate whether the one or more commands were successfully received or implemented. For these examples, the response may be provided via response output 440 and may be provided in a binary-based digital format (e.g., in a I²C, 1-Wire or SMBus compliant format) and routed through the serial interface at the peripheral device to the interconnect coupling the peripheral device to the computing device. As mentioned above, the response signal may be converted to an analog signal and routed through a microphone audio channel of an audio port at the computing device.

Figure 5:
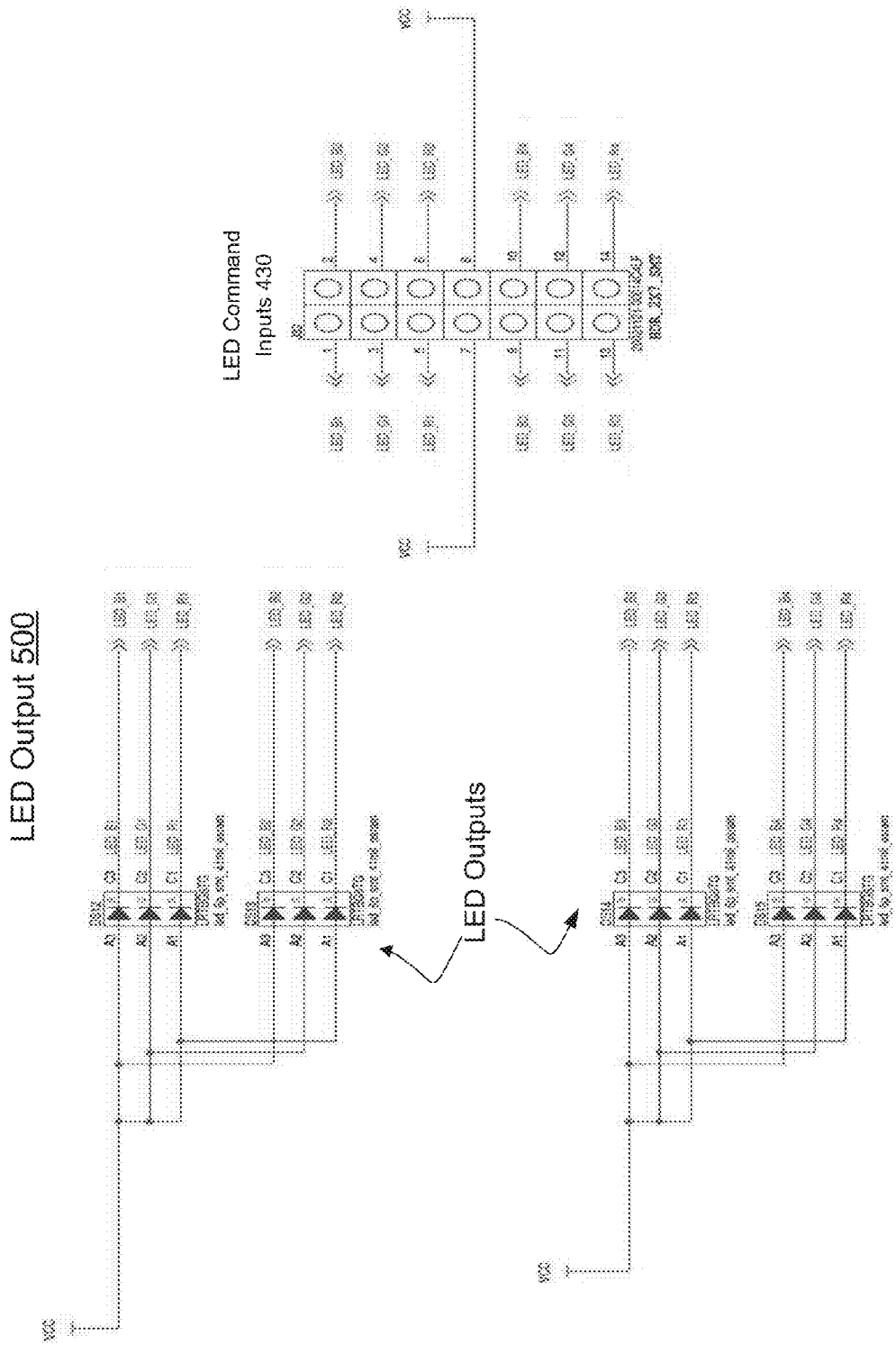
FIG. 5 illustrates an example first LED output.

FIG. 5 illustrates an example first LED output. The first LED output, as shown in FIG. 5, includes LED output 500. According to some examples, LED output 500 may be generated based on LED command inputs 430 generated by color/duration LED controller 400 as mentioned above for FIG. 4. Thus, as shown in FIG. 5, LED command inputs 430 for color and/or duration may control color and/or duration of an output for four sets of B, G and R colored LEDs.

Figure 6:
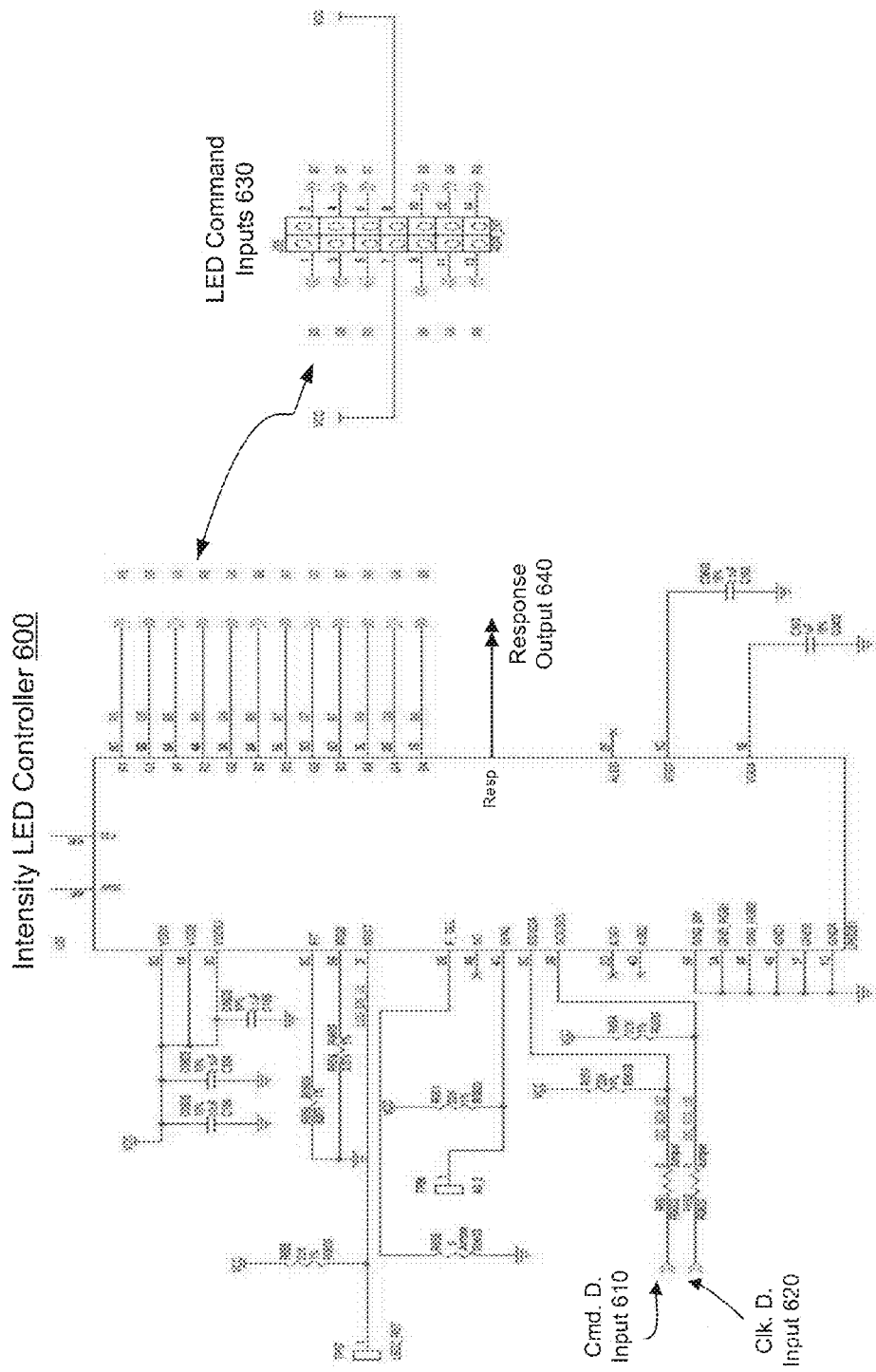
FIG. 6 illustrates an example second LED controller.

FIG. 6 illustrates an example second LED controller. The second LED controller, as shown in FIG. 6, includes an intensity LED controller 600. In some examples, intensity LED controller 600 may include Cmd. D. input 610 and Clk. D. input 620 that may result in LED command inputs 630.

According to some examples, similar to color/duration LED controller 400, intensity LED controller 600 may be at a peripheral device having a serial interface to receive one or more commands from a computing device that couples the peripheral device to the computing device via an audio port. For these examples, the one or more commands may be received by intensity LED controller 600 through Cmd. D. input 610 and Clk. D. input 620. Circuitry at intensity LED controller 600 may then generate LED command inputs 630 based on the one or more received commands.

In some examples, LED command inputs 630 may control intensity for LEDs capable of producing B, G or R colors. As shown in FIG. 6, LED command inputs 630 may be controlling brightness or intensity of four sets of R, G or B colored LEDs. These colored LEDs, for example, may be part of an LED display at the peripheral device.

According to some examples, intensity LED controller 600 may be capable of generating or providing a response to the computing device that sent the one or more commands to indicate whether the one or more commands were successfully received or implemented. For these examples, the response may be provided via response output 640 and may be provided in a binary-based digital format (e.g., in a I²C, 1-Wire or SMBus compliant format) and routed through the serial interface at the peripheral to the interconnect coupling the peripheral to the computing device. As mentioned above, the response signal may be converted to an analog signal and routed through a microphone audio channel of an audio port at the computing device.

Figure 7:
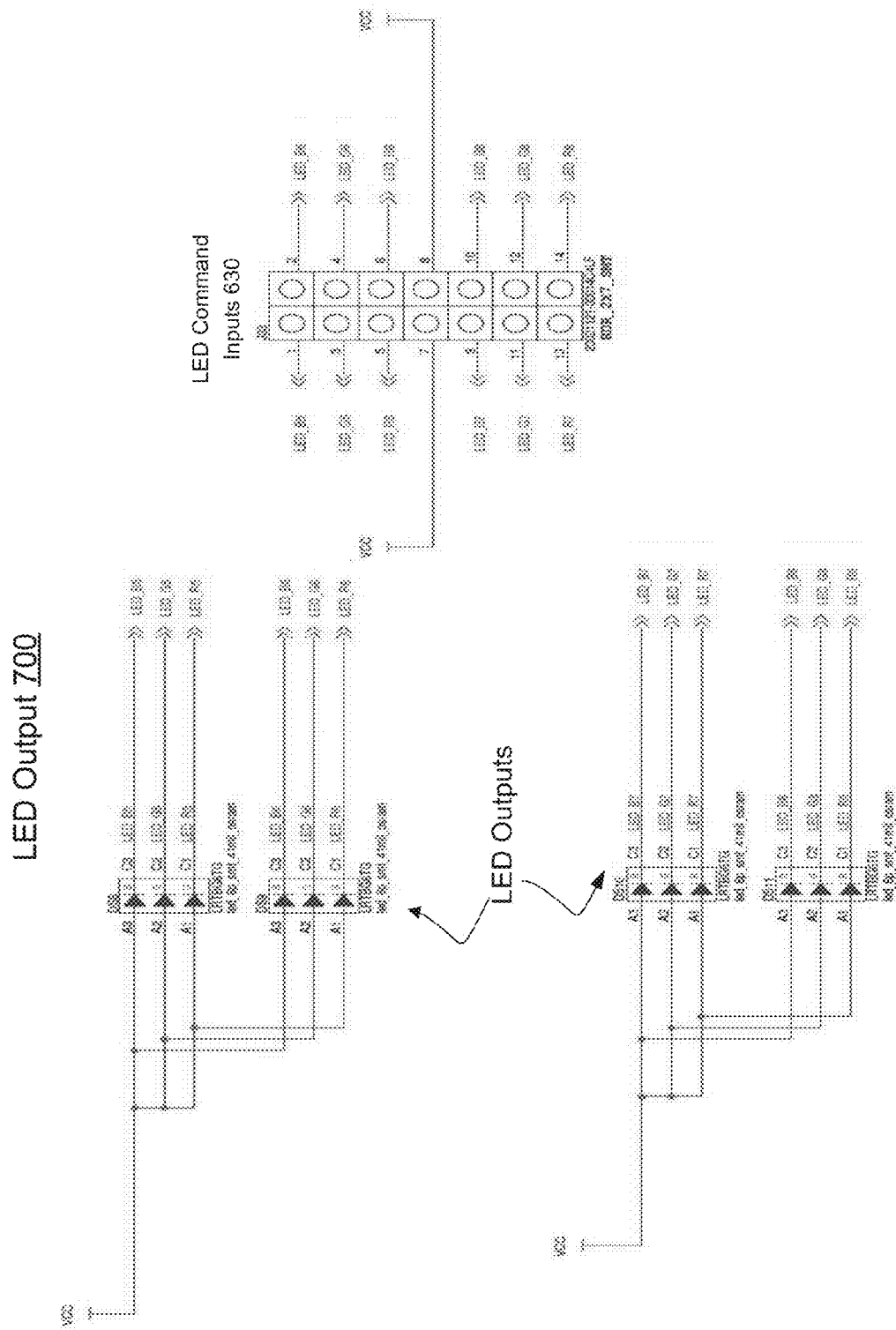
FIG. 7 illustrates an example second LED output.

FIG. 7 illustrates an example second LED output. The second LED output, as shown in FIG. 7, includes LED output 700. According to some examples, LED output 700 may be generated based on LED command inputs 630 generated by intensity LED controller 600 as mentioned above for FIG. 6. Thus, as shown in FIG. 7, LED command inputs 630 for intensity may control intensity or brightness of an output for four sets of B, G and R colored LEDs.

Figure 8:
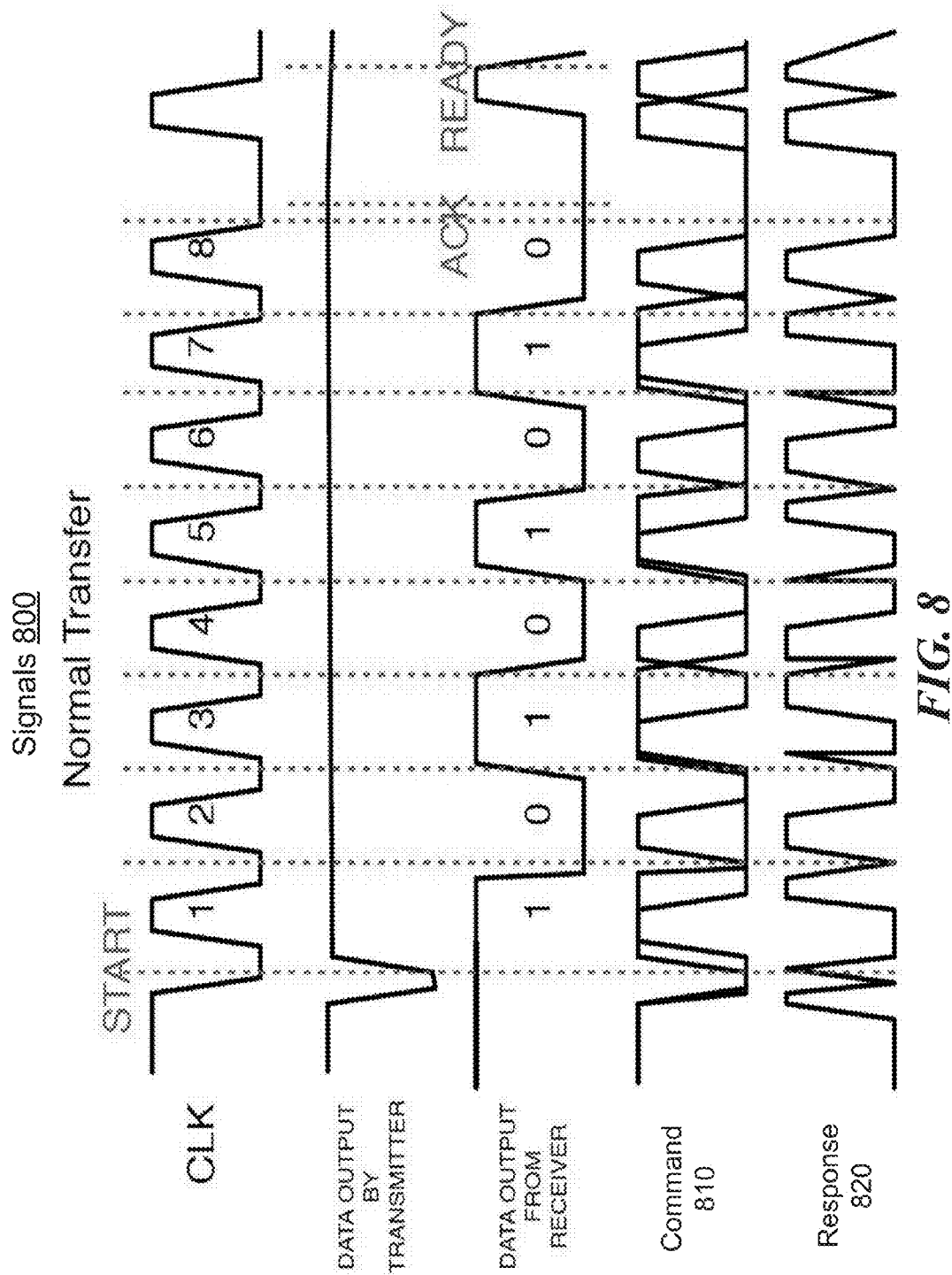
FIG. 8 illustrates example first signals.

FIG. 8 illustrates example first signals. The first signals, as shown in FIG. 8, include signals 800. According to some examples, 8 bits of information may be transferred via either a command signal 810 or via a response signal 820. For these examples, the falling edge of the clock determines whether the outputted value is interpreted as a "1" or a "0".

In some examples, the example command signal 810 included in signals 800 may represent a command digital signal provided to a peripheral device following conversion of an analog signal by circuitry in an interconnect (e.g., interconnect 300) representing one or more commands to control the peripheral device sent by a computing device (e.g., computing device 105) via an audio port coupled to the interconnect.

According to some examples, the response signal 820 included in signals 800 may represent a response signal received at an interconnect. Response digital signal 820 may be responsive to the one or more commands delivered in command signal 810 and may indicate whether the one or more commands were successfully received or implemented by the peripheral device. Response signal 820, in some examples, may also represent at least some data associated with the peripheral device implementing one or more commands received via a command signal such as command signal 810.

Figure 9:
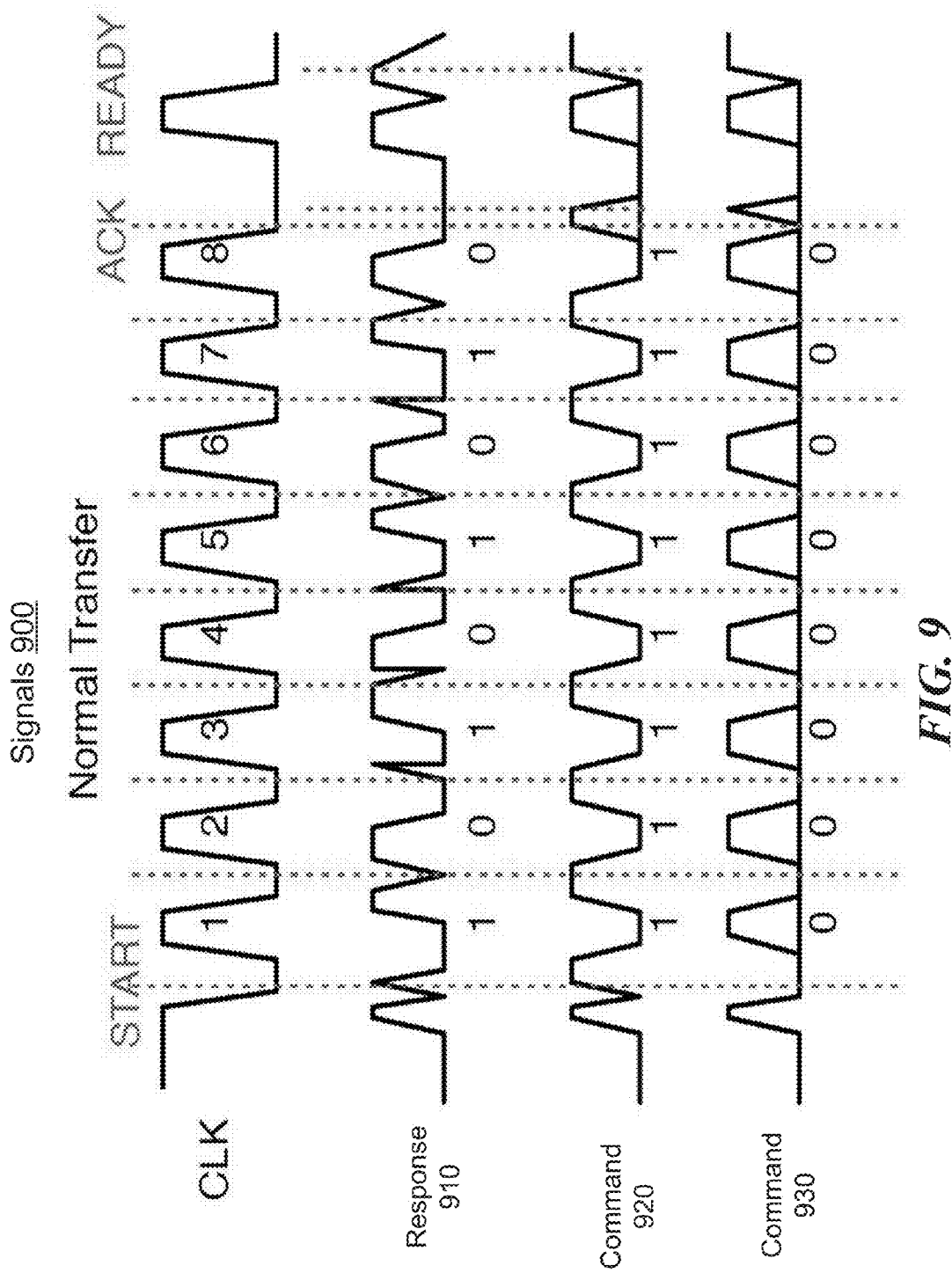
FIG. 9 illustrates example second signals.

FIG. 9 illustrates example second signals. The second signals, as shown in FIG. 9, include signals 900. According to some examples, 8 bits of information may be transferred via response or command signals as shown in FIG. 9. For these examples, similar to signals 800 in FIG. 8, the falling edge of the clock determines whether the signal associated with the response or digital signal is interpreted as a "1" or a "0".

Figure 10:
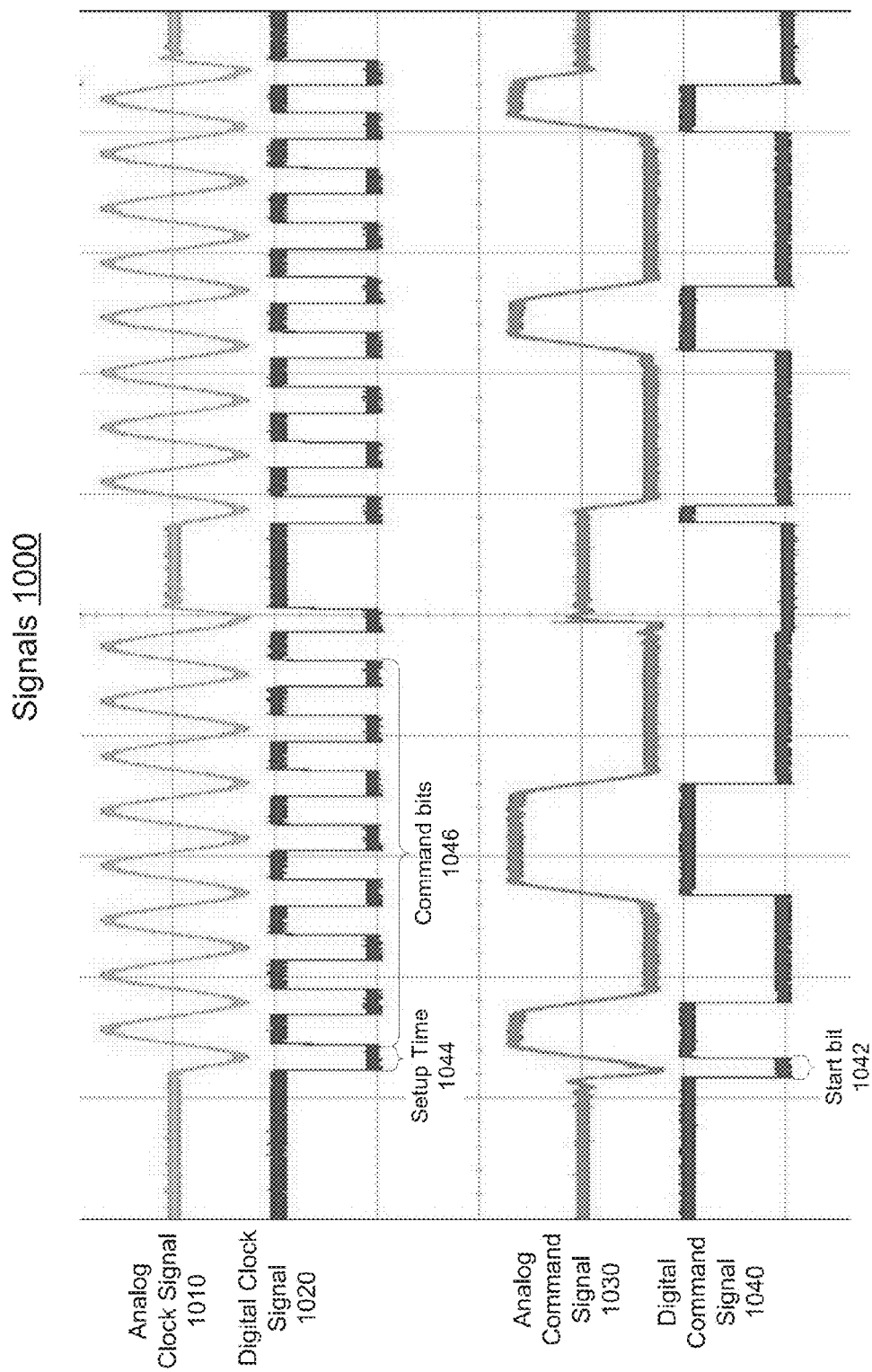
FIG. 10 illustrates example third signals.

FIG. 10 illustrates example third signals. The third signals, as shown in FIG. 10, include signals 1000, In some examples, an analog clock signal 1010 may be outputted or transmitted by a computing device (e.g., computing device 105) via an audio port coupled to an audio jack for an interconnect (e.g., interconnect 160). A digital clock signal 1020, for example, as shown in FIG. 10 may be a conversion of analog clock signal 1010 to digital clock signal by a converter (e.g., 320) included in the interconnect.

According to some examples, an analog command signal 1030 may also be outputted or transmitted by the computing device via the audio port and then converted to digital command signal 1040 by the converter included in the interconnect. For these examples, the rising edge of digital clock signal 1020 may indicate a bit state for a command being conveyed via digital command signal 1030. As shown in FIG. 10, for example, start bit 1042 may indicate the beginning of a command and setup time 1044 may indicate setup time before reading command bits 1046 for the next 8 rising edges of digital clock signal 1020. Thus, as shown in FIG. 10 command bits 1046 may include a 1-byte command. The 1-byte command, for example, may enable the computing device to control a peripheral device coupled to a connector for the interconnect.

Figure 11:
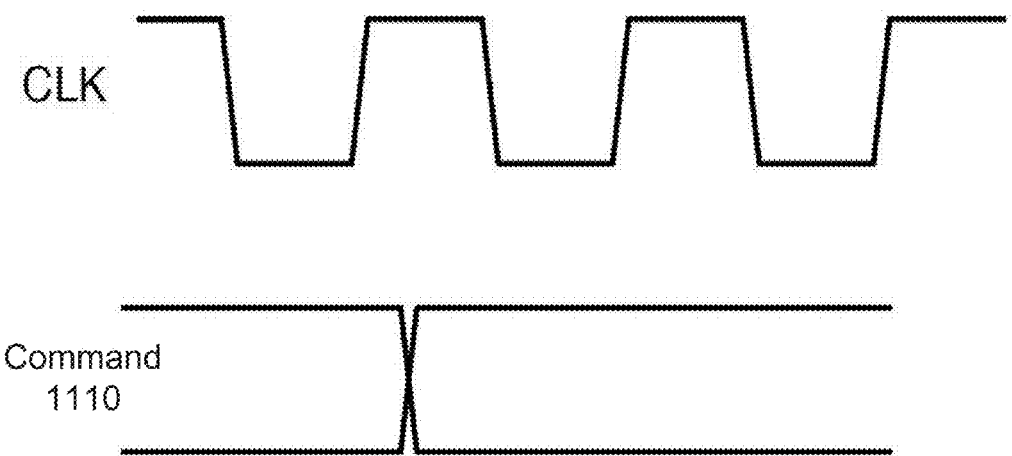
FIG. 11 illustrates example fourth signals.

FIG. 11 illustrates example fourth signals. The fourth signals, as shown in FIG. 11, include signals 1100. In some examples, a command digital signal 1110 that toggles as shown in FIG. 11 following a given number of clock cycles may indicate to a peripheral device to abort implementation of one or more commands previously received. The toggle indication, for example, may allow for a quick an efficient means to terminate any pending commands vs. sending a full 8 bit command.

Figure 12:
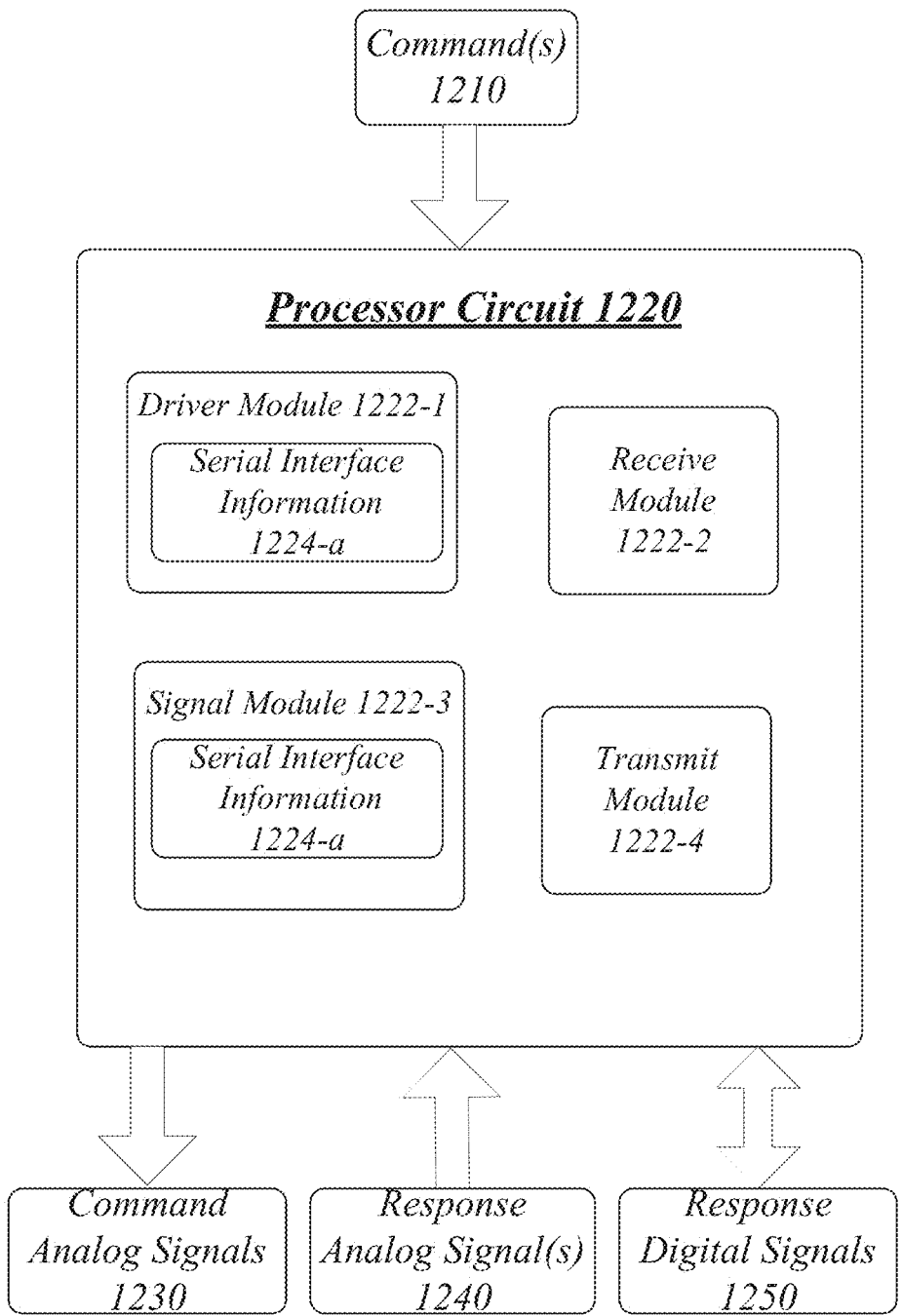
FIG. 12 illustrates an example apparatus.

FIG. 12 illustrates an example apparatus 1200. Although the apparatus 1200 shown in FIG. 12 has a limited number of elements in a certain topology, it may be appreciated that the apparatus 1200 may include more or less elements in alternate topologies as desired for a given implementation.

The apparatus 1200 may comprise a computer-implemented apparatus that may include at least some of the logic and/or features mentioned above for computing device for FIGS. 1-2. Apparatus 1200 may be arranged to execute one or more software and/or firmware modules 1222-*a*. It is worthy to note that "a" and "b" and "c" and similar designators as used herein are intended to be variables representing any positive integer. Thus, for example, if an implementation sets a value for a=4, then a complete set of modules 1222-*a* may include modules 1222-1, 1222-2, 1222-3 or 1222-4. The examples are not limited in this context.

According to some examples, apparatus 1200 may be capable of being located with a computing device such as computing device 105. For these examples, apparatus 1200 may be included in or implemented by a processor, processor circuitry or processor circuit. In other examples, at least some portions of apparatus 1200 may be implemented as part of firmware and/or software implemented driver(s) executed by an operating system for the computing device. The examples are not limited in this context.

In some examples, if implemented by a processor circuit, the processor may be generally arranged to execute one or more modules 1222-*a*. The processor can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm Snapdragon® processors; Intel® Celeron®, Core (2) Duo®, Core i3, Core i5, Core i7, Pentium®, and XScale® processors; and similar processors. According to some examples processor circuit 1220 may also be an application specific integrated circuit (ASIC) and at least some modules 1222-*a* may be implemented as hardware elements of the ASIC.

In some examples, apparatus 1200 may include a driver module 1222-1. Driver module 1222-1 may be executed by processor circuit 1220 to generate a command signal responsive to receiving a command to control a peripheral device from an application. For these examples, driver module 1222-1 may generate and send a command signal in a binary-based digital format. According to some examples, driver module 1222-1 may format the command signal according to one or more standards related to a serial interface such as the I²C or SMBus specifications using serial interface information 1224-*a* (e.g., maintained in a data structure such as a lookup table (LUT)). In some examples, command(s) 1210 may include the commands from the application and the peripheral device to control an LED display that may have one or more controllers to control color, duration or intensity of LEDs for the LED display.

According to some examples, apparatus 1200 may also include a receive module 1222-2. Receive module 1222-2 may be executed by processor circuit 1220 to receive the command signal from driver module 1222-1. Receive module 1222-1 may also receive a clock signal for to facilitate interpreting the command signal.

In some examples, apparatus 1200 may also include signal module 1222-3. Signal module 1222-3 may be executed by processor circuit 1220 to cause generation of a first analog signal to represent the command signal and a second analog signal to represent the clock signal. For these examples, the first analog and second analog signals may be included in command/clock analog signals 1230.

In some examples, signal module 1222-3 may also receive a response to the one or more commands via response analog signals(s) 1240 (e.g., received via a microphone audio channel of an audio port). For these examples, signal module 1222-3 may cause a conversion of the response included in response analog signal(s) 1240 to a response digital signal included in response digital signals 1250 by an analog-to-digital circuit. Signal module 1222-3 may format the response digital signal in a binary-based, digital response signal using serial interface information 1224-*a*. Signal module 1222-3 may then forward the binary-based digital response signal to driver module 1222-1 for drive module 1222-1 to forward the response to the application that originated the command to control the peripheral device.

According to some examples, apparatus 1200 may also include a transmit module 1222-4. Transmit module 1222-4 may be executed by processor circuit 1220 to cause transmission of the first analog signal over a first audio channel of an audio port for the computing device that includes apparatus 1200. Transmit module 1222-4 may also cause transmission of the second analog signal over a second audio channel of the audio port. As mentioned above, the first analog signal may represent one or more commands and the second analog signal may represent a clock signal.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 13 illustrates a logic flow 1300. Logic flow 1300 may be representative of some or all of the operations executed by one or more logic, features, or devices described herein, such as apparatus 1200 that may be included with or is a part of a computing device such as computing device 105 mentioned above for FIGS. 1-2. More particularly, logic flow 1300 may be implemented by driver module 1222-1, receive module 1222-2, signal module 1222-3 or transmit module 1222-4.

According to some examples, logic flow 1300 at block 1302 may receive, at a processor circuit for a computing device, a command to control a peripheral device coupled to the computing device via an interconnect having an audio jack coupled with an audio port of the computing device and also having a connector coupled with a serial interface of the peripheral device. For these examples, receive module 1222-2 may receive the command from driver module 1222-1. Also, driver module 1222-1 may have received the command from an application being executed on the computing device.

In some examples, logic flow 1300 at block 1304 may generate analog signals that include the command and a clock signal. Also, logic flow 1300 at block 1306 may include the command in a first analog signal. Also, logic flow 1300 at block 1308 may include the clock signal in a second analog signal. For these examples, signal module 1222-3 may generate the analog signals.

According to some examples, logic flow 1300 at block 1310 may transmit the analog signals through the audio port coupled with the audio jack. Also, logic flow 1300 at block 1312 may transmit the first analog signal via a right audio channel of the audio port. Also, logic flow 1300 at block 1314 may transmit the second analog signal via a left audio channel of the audio port. For these examples, transmit module 1222-4 may cause the transmission of the first and second analog signals.

Figure 14:
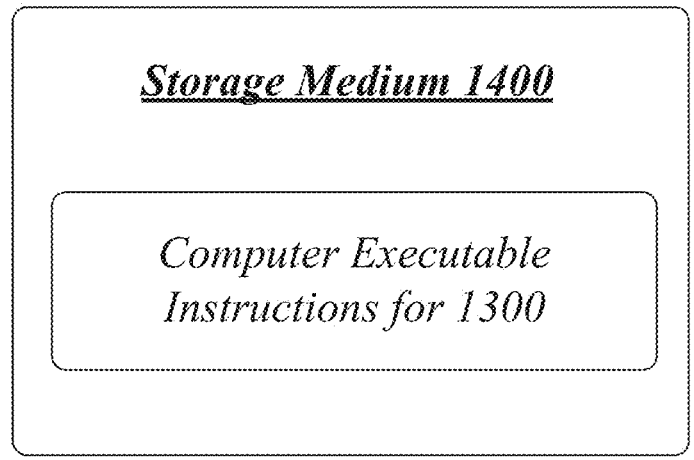
FIG. 14 illustrates an example storage medium.

FIG. 14 illustrates an embodiment of a storage medium 1400. The storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
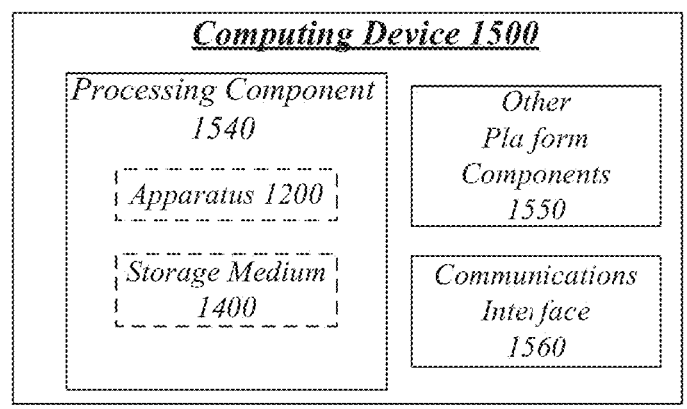
FIG. 15 illustrates an example computing device.

FIG. 15 illustrates an example computing device 1500. In some examples, as shown in FIG. 15, computing device 1500 may include a processing component 1540, other platform components 1550 or a communications interface 1560.

According to some examples, processing component 1540 may execute processing operations or logic for apparatus 1200 and/or computer readable medium 1400. Processing component 1540 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1550 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units associated with either other platform components 1550 may include without limitation, various types of computer readable and machine readable storage media in the form of one or more higher speed memory units, such as ROM, RAM, DRAM, Double-Data-Rate DRAM (DDRAM), synchronous DRAM (SDRAM), SRAM, programmable ROM (PROM), EPROM, EEPROM, NAND flash memory, NOR flash memory, polymer memory such as ferroelectric polymer memory, ferroelectric transistor random access memory (FeTRAM or FeRAM), nanowire, ovonic memory, ferroelectric memory, 3-dimentional cross-point memory, SONOS memory, magnetic or optical cards, an array of devices such as Redundant Array of Independent Disks (RAID) drives, solid state memory devices (e.g., USB memory), SSDs and any other type of storage media suitable for storing information.

In some examples, communications interface 1560 may include logic and/or features to support a communication interface. For these examples, communications interface 1560 may include one or more communication interfaces that operate according to various communication protocols or standards to communicate over direct or network communication links. Direct communications may occur via use of communication protocols or standards described in one or more industry standards (including progenies and variants) to include the Peripheral Component Interconnect (PCI) Express Base Specification, revision 3.0, published in November 2010 ("PCI Express" or "PCIe") and/or the Universal Serial Bus Specification, revision 3.0, published in November 2008 ("USB"). Network communications may occur via use of various communication protocols and may operate in compliance with one or more promulgated standards or specifications for wired or wireless networks by the Institute of Electrical Engineers (IEEE). These standards are specifications may include, but are not limited to, IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11") for wireless mediums or IEEE 802.3-2008, Carrier sense Multiple access with Collision Detection (CSMA/CD) Access Method and Physical Layer Specifications, Published in December 2008 (hereinafter "IEEE 802.3") for wired mediums.

Computing device 1500 may be, for example, user equipment, a computer, a personal computer (PC), a desktop computer, a laptop computer, a notebook computer, a netbook computer, a tablet computer, a tablet, a portable gaming console, a portable media player, a smart phone, or combinations thereof. Accordingly, functions and/or specific configurations of computing device 1500 described herein, may be included or omitted in various embodiments of computing device 1500, as suitably desired.

The components and features of computing device 1500 may be implemented using any combination of discrete circuitry, application specific integrated circuits (ASICs), logic gates and/or single chip architectures. Further, the features of computing device 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing device 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, at a processor circuit for a computing device, a command originating from an application, the command to update a display of a peripheral device coupled to the computing device via an interconnect having an audio jack coupled with an audio port of the computing device;
generating analog signals that include the command and a clock signal, the analog signals configured to be converted into a serial output signal by the interconnect; and
transmitting the analog signals through the audio port coupled with the audio jack.

2. The method of claim 1, comprising:
converting, by the interconnect, the analog signals to a command digital signal and a digital clock signal; and
providing the command digital signal and the clock digital signal to a serial interface at the peripheral device.

3. The method of claim 2, comprising the serial interface at the peripheral device, the digital command signal and the digital clock signal arranged in compliance with an industry standard to include I²C-bus specification, Revision 5, 1-Wire Network, Design Guide, Version 1.0 or System Management Bus (SMBus) specification, Version 2.0.

4. The method of claim 1, comprising:
generating the analog signals that include the command and the clock signal such that the command is included in a first analog signal and the clock signal is included in a second analog signal;
transmitting the first analog signal via a first audio channel of the audio port coupled with the audio jack; and
transmitting the second analog signal via a second audio channel of the audio port coupled with the audio jack.

5. The method of claim 4, the peripheral device comprising a light emitting diode (LED) display, the command to include one of a color command to control a color emitted from one or more LEDs included in the LED display, a light intensity command for the one or more LEDs or a light duration command for light emission for the one or more LEDs.

6. The method of claim 5, the interconnect coupled with a serial interface at the peripheral device, the serial interface to comprise part of a controller for the LED display.

7. The method of claim 1, comprising:
receiving a response to the command in a response analog signal via a microphone audio channel of the audio port coupled with the audio jack.

8. The method of claim 7, comprising the response to include one of an acknowledgement (ACK) from the peripheral device that indicates a successful receipt of the command or a negative acknowledgement (NAK) from the peripheral device that indicates an unsuccessful receipt of the command.

9. The method of claim 7, comprising the response including data provided by the peripheral device responsive to the command.

10. The method of claim 1, comprising the audio port for the computing device capable of coupling with a standard TRRS audio jack having a connector length of 3.5 millimeters.

11. A computing device, comprising:
an audio port including first and second audio channels;
a processor circuit coupled to the audio port;
a receive module for execution by the processor circuit to receive a command signal and a clock signal to update a display of a peripheral device;
a signal module for execution by the processor circuit to cause generation of a first analog signal to represent the command signal and a second analog signal to represent the clock signal, the first analog signal and the second analog signal configured to be converted into a serial output signal by an interconnect having an audio jack coupled with the audio port; and
a transmit module for execution by the processor circuit to cause transmission of the first analog signal over the first audio channel and the second analog signal over the second audio channel of the audio port.

12. The computing device of claim 11, comprising:
a driver module for execution by the processor circuit to generate the command signal responsive to receiving a command to control the peripheral device from an application and send the command signal to the receive module, the command signal generated in a binary-based digital format; and
the signal module to cause a digital-to-analog circuit to convert the binary-based digital formatted command signal and the clock signal to the first and second analog signals.

13. The computing device of claim 12, comprising:
the audio port including a third audio channel;
the signal module to receive a response to the converted command signal in a response analog signal over the third audio channel of the audio port, the signal module to cause a conversion of the response analog signal to a response digital signal by an analog-to-digital circuit, the signal module to format the response digital signal in a binary-based, digital response signal, the signal module to forward the binary-based digital response signal to the driver module for the driver module to forward the response to the application that originated the command to control the peripheral device.

14. The computing device of claim 13, comprising the binary-based, digital response signal to include one of an acknowledgement (ACK) from the peripheral device that indicates a successful receipt of the command to control the peripheral device or a negative acknowledgement (NAK) from the peripheral device that indicates an unsuccessful receipt of the command to control the peripheral device.

15. The computing device of claim 13, comprising the binary-based, digital response signal to include data provided by the peripheral device responsive to the command to control the peripheral device.

16. The computing device of claim 13, comprising the command signal or the response signal generated in the binary-based digital format arranged in compliance with an industry standard to include I²C-bus specification, Revision 5, 1-Wire Network, Design Guide, Version 1.0 or System Management Bus (SMBus) specification, Version 2.0.

17. The computing device of claim 13, comprising the first audio channel is a left audio channel, the second audio channel is a right audio channel and the third audio channel is a microphone audio channel.

18. The computing device of claim 12, the peripheral device comprising a light emitting diode (LED) display, the command to control the peripheral device to include one of a color command to control a color emitted from one or more LEDs included in the LED display, a light intensity command for the one or more LEDs or a light duration command for light emission for the one or more LEDs.

19. The computing device of claim 11, comprising the audio port capable of coupling with a standard TRRS audio jack having a connector length of 3.5 millimeters.

20. At least one non-transitory machine readable medium comprising a plurality of instructions that in response to being executed by a system for a computing device causes the system to:
generate a command signal responsive to receiving a command to update a display of a peripheral device coupled to the computing device from an application, the command signal generated in a binary-based digital format;
convert the binary-based digital formatted command signal to a first analog signal to represent the command signal and convert a clock signal to a second analog signal to represent the clock signal, the first analog signal and the second analog signal configured to be converted into a serial output signal by an interconnect having an audio jack coupled with an audio port of the computing device; and
transmit the first analog signal over a first audio channel of the audio port of the computing device and the second analog signal over a second audio channel of the audio port.

21. The at least one machine readable medium of claim 20, comprising the instructions to also cause the system to:
receive a response to the command to control the peripheral device in a response analog signal via a third audio channel of the audio port, the response analog signal converted to a response signal in a binary-based, digital response signal, the binary-based digital response to include one of an acknowledgement (ACK) from the peripheral device that indicates a successful receipt of the command to control the peripheral device or a negative acknowledgement (NAK) from the peripheral device that indicates an unsuccessful receipt of the command to control the peripheral device.

22. The at least one machine readable medium of claim 21, comprising the command signal or the response signal generated in the binary-based digital format arranged in compliance with an industry stand to include $I^2C$-bus specification, Revision 5, 1-Wire Network, Design Guide, Version 1.0 or System Management Bus (SMBus) specification, Version 2.0.

23. The at least one machine readable medium of claim 21, comprising the first audio channel is a left audio channel, the second audio channel is a right audio channel and the third audio channel is a microphone audio channel.

24. An apparatus comprising:
an audio jack capable of coupling to an audio port of a computing device and including a first audio channel capable of receiving through the audio port a first analog signal representing a command to control a peripheral device and a second audio channel capable of receiving a second analog signal representing a clock signal;
an analog-to-digital converter to convert the first analog signal to a command digital signal and convert the second analog signal to a clock digital signal; and
a connector to couple with a serial interface at the peripheral device to provide the command digital signal and the clock digital signal to the peripheral device.

25. The apparatus of claim 24 comprising:
the connector capable of receiving a response to the command digital signal from the peripheral device;
a digital-to-analog converter to convert the response to a response analog signal; and
the audio jack including a third audio channel capable of providing the response analog signal to the computing device through the audio port.

26. The apparatus of claim 25, comprising the first audio channel is a left audio channel, the second audio channel is a right audio channel and the third audio channel is a microphone audio channel.

27. The apparatus of claim 24, comprising the command digital signal formatted in compliance with an industry standard to include $I^2C$-bus specification, Revision 5 or System Management Bus (SMBus) specification, Version 2.0.

28. The apparatus device of claim 24, the audio jack comprising a standard TRRS audio jack having an audio port connector length of 3.5 millimeters.

\* \* \* \* \*